(12) United States Patent
Delin

(10) Patent No.: US 7,924,216 B2
(45) Date of Patent: Apr. 12, 2011

(54) METHOD OF DETERMINING A DISTURBANCE ECHO PROFILE FOR A RADAR LEVEL GAUGE SYSTEM

(75) Inventor: Hakan Delin, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 12/112,148

(22) Filed: Apr. 30, 2008

(65) Prior Publication Data

US 2009/0273506 A1 Nov. 5, 2009

(51) Int. Cl.
G01F 23/284 (2006.01)
G01S 13/08 (2006.01)

(52) U.S. Cl. .................................. 342/124; 73/290 R (58) Field of Classification Search .................. 342/124; 367/908; 73/290 R
See application file for complete search history.

(56) References Cited

U.S. PATENT DOCUMENTS

| | | | | |
|---|---|---|---|---|
| 3,394,589 | A * | 7/1968 | Tomioka | 73/290 V |
| 4,748,846 | A * | 6/1988 | Haynes | 73/290 V |
| 4,928,525 | A * | 5/1990 | Aderholt et al. | 73/290 V |
| 5,438,867 | A * | 8/1995 | van der Pol | 73/290 V |
| 5,614,911 | A * | 3/1997 | Otto et al. | 342/124 |
| 5,734,346 | A * | 3/1998 | Richardson et al. | 342/124 |
| 5,973,637 | A | 10/1999 | Perdue et al. | 342/124 |
| 6,047,598 | A * | 4/2000 | Otto et al. | 73/290 V |
| 6,078,280 | A | 6/2000 | Perdue et al. | 342/124 |
| 6,504,793 | B2 * | 1/2003 | Fuenfgeld | 367/99 |
| 6,816,436 | B1 * | 11/2004 | Bachert | 367/99 |
| 6,972,712 | B1 * | 12/2005 | Karlsson | 342/124 |
| 7,525,476 | B1 * | 4/2009 | Delin et al. | 342/124 |

FOREIGN PATENT DOCUMENTS

| | | |
|---|---|---|
| DE | 4327333 | 8/1993 |
| DE | 102004055551 | 11/2004 |
| WO | WO 9214996 A1 * | 9/1992 |
| WO | WO03/016835 | 2/2003 |

OTHER PUBLICATIONS

International Search Report for PCT/SE2009/050454, filed Apr. 28, 2009; 4 pages.

* cited by examiner

*Primary Examiner* — Thomas H Tarcza
*Assistant Examiner* — Cassi Galt
(74) *Attorney, Agent, or Firm* — Westman, Champlin & Kelly, P.A.

(57) ABSTRACT

A method of determining a filling level of a product contained in a tank, the method comprising generating and transmitting electromagnetic signals; propagating the transmitted electromagnetic signals towards a surface of the product contained in the tank; receiving echo signals resulting from reflections at impedance transitions encountered by the transmitted electromagnetic signals, including a surface echo signal resulting from reflection at a surface of the product; determining a position of a reference impedance transition using a reference echo signal resulting from reflection of the transmitted electromagnetic signals at the reference impedance transition; determining an update level located above the surface, based on the determined position of the reference impedance transition and a known position of the reference impedance transition; determining a disturbance echo profile using at least one of the echo signals resulting from reflection of the transmitted signals at at least one impedance transition located above the update level; and determining the filling level based on the received echo signals and the disturbance echo profile.

12 Claims, 9 Drawing Sheets

METHOD OF DETERMINING A DISTURBANCE ECHO PROFILE FOR A RADAR LEVEL GAUGE SYSTEM

TECHNICAL FIELD OF THE INVENTION

The present invention relates to a method of determining a disturbance echo profile for a radar level gauge system, and to a radar level gauge system and method for filling level determination of a product contained in a tank using such a disturbance echo profile.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems are generally referred to as being of the FMCW (Frequency Modulated Continuous Wave) type.

In any case, the propagated electromagnetic signal is typically not only reflected at the impedance transition constituted by the interface between atmosphere and surface, but at several other impedance transitions encountered by the signal. Such impedance transitions may, for example, result from fixed structures in the tank or, in the case of a GWR-system, product residue that may have adhered to the probe as the filling level of the product changes inside the tank.

There is therefore a risk that the system attempts to determine the filling level based on the wrong reflected signal. This is especially the case when the product inside the tank has similar signal propagation characteristics as the atmosphere in the tank. This results in a small impedance transition and, accordingly, a relatively weak echo signal. Examples of products yielding relatively weak echo signals are liquid natural gas (LNG), liquid petroleum gas (LPG), oil-based products, solids such as plastic pellets or grain etc.

One way of reducing the risk for such an erroneous determination of the filling level is to make a reference filling level measurement when the tank is empty. A typical result from such a reference filling level measurement is a disturbance echo profile, in which echoes representing disturbances that may be present in the tank are visible. This disturbance echo profile can be used to modify an echo profile obtained during normal measurement conditions. For example, for a pulsed RLG system, at least a part of the disturbance echo profile may be subtracted from the echo profile obtained during normal measurement conditions.

However, conditions in the tank generally vary over time in such a way that existing disturbances move and/or new sources of disturbance echoes are added, such as, for example, lumps of material, such as oil, adhering to the probe in the case of GWR-measurements.

Such varying conditions may be taken into account by determining a disturbance echo profile during normal measurement conditions, when the tank is not empty. However, such a disturbance echo profile can then only be reliably determined above the surface of the product contained in the tank, because of the relatively stable propagation characteristics in the atmosphere above the surface of the product.

U.S. Pat. No. 6,078,280 discloses a method for determining a disturbance echo profile above the surface of a product contained in a tank, involving automatically determining a transition point that defines which part of a newly acquired echo profile to use for updating a previously stored disturbance echo profile. According to U.S. Pat. No. 6,078,280, this transition point is determined based on the surface echo signal.

Under certain conditions, it may, however, be difficult to determine the surface echo signal, which may result in that the surface echo signal is included in the disturbance echo profile when the method disclosed in U.S. Pat. No. 6,078,280 is used, which may lead to an incorrect filling level determination.

SUMMARY OF THE INVENTION

In view of the above-mentioned and other drawbacks of the prior art, a general object of the present invention is to provide an improved radar level gauge system and method, and in particular a radar level gauge system and method enabling a more reliable filling level determination.

According to a first aspect of the present invention, these and other objects are achieved through a method of determining a filling level of a product contained in a tank, the method comprising generating and transmitting electromagnetic signals; propagating the transmitted electromagnetic signals towards a surface of the product contained in the tank; receiving echo signals resulting from reflections at impedance transitions encountered by the transmitted electromagnetic signals, including a surface echo signal resulting from reflection at a surface of the product; determining a position of a reference impedance transition using a reference echo signal resulting from reflection of the transmitted electromagnetic signals at the reference impedance transition; determining an update level located above the surface, based on the determined position of the reference impedance transition and a known position of the reference impedance transition; determining a disturbance echo profile using at least one of the echo signals resulting from reflection of the transmitted signals at least one impedance transition located above the update level; and determining the filling level based on the received echo signals and the disturbance echo profile.

It should be noted that none of the methods according to the various aspects of the present invention is limited to performing the steps thereof in any particular order. Furthermore, some steps may be performed at one point in time, and other steps at another point in time.

The tank may be any container or vessel capable of containing a product, and may be metallic, or partly or completely non-metallic, open, semi-open, or closed. Furthermore, the filling level of the product contained in the tank may be determined directly by using a signal propagation device propagating the transmitted electromagnetic signal towards the product inside the tank, or indirectly by using a propagation device disposed inside a so-called chamber located on the outside of the tank, but being in fluid connection with the inside of the tank in such a way that the level in the chamber corresponds to the level inside the tank.

By "signal propagation characteristics of the product contained in the tank" should, in the context of the present application, at least be understood the characteristic of whether the transmitted signal propagates with a different propagation velocity in the product than in the tank atmosphere above the surface of the product.

The present invention is based on the realization that a more reliable determination of a disturbance echo profile can be achieved by determining a update level that, with a very high degree of reliability, is located above the surface of the product contained in the tank, but still close to the surface, and then determining the disturbance echo profile using echo signals resulting from reflection of the transmitted signal at impedance transitions located above this update level.

The present inventor has further realized that such this update level can be determined with the desired, very high degree of reliability using the difference between a known position of a reference impedance transition and a position thereof determined using a received echo signal.

According to embodiments of the invention, knowledge about the signal propagation characteristics of the product contained in the tank may additionally be used.

The determined update level is equivalent to a transition point in an acquired echo profile between a part of the echo profile that is the new disturbance echo profile (or is a part of the new disturbance echo profile) and a part of the echo profile that is not included in the disturbance echo profile.

The purpose of the disturbance echo profile is to facilitate the identification of a surface echo signal resulting from reflection of the transmitted electromagnetic signal at the impedance transition constituted by the surface of the product contained in the tank. By modifying an acquired echo profile using the determined disturbance echo profile, any disturbance echo signal that might otherwise erroneously be taken to be the surface echo signal can be removed from the acquired echo profile, whereby the reliability of the filling level determination can be improved.

As is also mentioned in the Background section above, the method and system according to the present invention are particularly useful in situations when the product inside the tank has similar signal propagation characteristics as the atmosphere in the tank.

If the surface echo signal is used to determine the above-mentioned update level, an erroneous classification of the surface echo signal may lead to an erroneous choice of update level, which may, in fact lead to the introduction in the modified echo profile of one or several disturbance echo signals comparable in amplitude to the surface echo signal. Such an erroneous determination of the update level might even lead to removal of the surface echo signal, which would make correct determination of the filling level practically impossible.

According to embodiments of the present invention, this risk is eliminated by using a propagation velocity difference based determination of the update level instead of relying upon the ability to securely determine the surface echo signal.

The transition point for determining the disturbance echo profile can then be determined in such a way that it is ensured that the surface echo signal is not included in the disturbance echo profile.

According to one embodiment, the transmitted electromagnetic signal may be propagated towards the product using a radiating antenna such as a horn antenna or a patch antenna, and the reference impedance transition may be constituted by a fixed structure located below the surface of the product in the tank, such as a bottom of the tank.

According to another embodiment, the transmitted electromagnetic signal may be propagated along a probe extending towards and into the product contained in the tank.

In the context of the present application, the "probe" is a waveguide designed for guiding electromagnetic signals. Several types of probes, for example single-line, and twin-line probes may be used. The probes may be essentially rigid or flexible and they may be made from metal, such as stainless steel, plastic, such as PTFE, or a combination thereof.

The reference impedance transition may be located above or below the surface of the product contained in the tank. When determining the update level based on a reference impedance transition located above the surface, it is especially advantageous if a plurality of reference impedance transitions are provided along the probe in such a way that there is a first set of reference impedance transitions located above the surface and a second set of reference impedance transitions located below the surface. In that case, the update level can be determined by analyzing determined electrical distances between the reference impedance transitions (in particular by comparing the determined electrical distances with known distances), whereby it can be deduced if a certain reference impedance transition is located above the surface and, additionally, which reference impedance transition in the first set is closest to the surface. The position of this reference impedance transition may then constitute the update level. Alternatively, the update level can be determined with a higher precision based on electrical and known distances to the last unsubmerged reference impedance transition and the first submerged reference impedance transition, respectively, and the signal propagation characteristics of the product contained in the tank.

In case the reference impedance transition used to determine the update level is located below the surface of the product contained in the tank, the reference impedance transition may, for example be the submerged end of the probe, or a submerged reference reflector provided to the probe.

Such a reference reflector, as well any reference reflectors located above the surface of the product as described above, may be implemented as a structure capable of reflecting electromagnetic signals traveling along the probe and may be achieved by means of a structure external to the probe, an internal structure in the probe, or a combination thereof. Furthermore, different reference reflectors may be provided as identical or different reflecting structures.

That the position of the reference impedance transition is "known" means that the position has been previously determined by means of any suitable measurement technique. For example, the position may have been determined based on received electromagnetic signals reflected by the respective reference reflectors, but under controlled conditions, such as during production of the radar level gauge system or when the system is installed but the probe is clean and the tank empty. The method includes comprising determining said propagation characteristics based on said surface echo signal, said reference echo signal and said known position of the reference impedance transition.

In the case that the reference impedance transition used to determine the update level is located below the surface, an at least approximate knowledge of the propagation characteristics—specifically of the relative permittivity—of the product is needed. Such knowledge can, for example, be gained through knowledge of the composition of the product contained in the tank, in combination with environmental data, such as the temperature of the product. The permittivity can then be taken from known tables. Alternatively, the relative permittivity can be determined based on a distance to the surface of the product determined using the surface echo signal, the electrical distance to the reference impedance transition and the known, physical distance to the reference impedance transition. Such a determination of the relative permittivity of the product may suitably be performed in a situation when the surface echo signal can be determined without any significant ambiguity, such as when the amount of product in the tank has been constant for some time, and/or when the surface echo signal amplitude is greater than a predetermined threshold value.

Alternatively, the relative permittivity of the product contained in the tank can be determined using two reference impedance transitions located at a known distance from each other below the surface of the product.

Furthermore, the determined disturbance echo profile may be used to modify the echo profile acquired during filling level determination in combination with a previously determined disturbance echo profile. For example, an initial disturbance echo profile may be updated using a subsequently determined disturbance echo profile. The initial disturbance echo profile may be determined when the tank is empty, for instance following installation of the radar level gauge system, but before product is filled in the tank.

Moreover, the method of determining the filling level of the product in the tank may further comprise the steps of forming a measurement echo profile using the received echo signals; combining the measurement echo profile and the disturbance echo profile to form a combined echo profile; identifying the surface echo signal using the combined echo profile; and determining the filling level based on the identified surface echo signal.

According to a second aspect of the present invention, the above-mentioned and other objects are achieved through a radar level gauge system, for determining a filling level of a product contained in a tank, comprising a transceiver for generating, transmitting and receiving electromagnetic signals; a propagating device electrically connected to the transceiver and arranged to propagate transmitted electromagnetic signals towards a surface of the product, and to return echo signals resulting from reflections at impedance transitions encountered by the transmitted electromagnetic signals back to the transceiver; a reference impedance transition provided at a known position in the tank; and processing circuitry for determining a position of the reference impedance transition using a reference echo signal resulting from reflection of the transmitted electromagnetic signals at the reference impedance transition; determining an update level located above the surface, based on the determined position of the reference impedance transition and a known position of the reference impedance transition; determining a disturbance echo profile using at least one of the echo signals resulting from reflection of the transmitted signals at at least one impedance transition located above the update level; and determining the filling level based on the received echo signals and the disturbance echo profile.

The "transceiver" may be one functional unit capable of transmitting and receiving electromagnetic signals, or may be a system comprising separate transmitter and receiver units.

According to one embodiment, the propagation device may be a probe arranged to extend towards and into the product contained in the tank for guiding the transmitted electromagnetic signal towards the surface of the product, and guiding the echo signals back towards the transceiver.

Moreover, the reference impedance transition may be provided below the surface of the product contained in the tank.

Furthermore, the processing circuitry comprised in the radar level gauge system according to the present invention may advantageously be configured to form a measurement echo profile using the received echo signals; combine the measurement echo profile and the disturbance echo profile to form a combined echo profile; identify the surface echo signal using the combined echo profile; and determine the filling level based on the identified surface echo signal.

It should be noted that any one or several of the means comprised in the processing circuitry may by provided as either of a separate physical component, separate hardware blocks within a single component, or software executed by one or several microprocessors.

As stated above, the reference impedance transition may, for example, be provided as the submerged end of the probe or as a reference reflector arranged at a known position along the probe.

To facilitate discrimination of an electromagnetic signal reflected by such a reference reflector from the electromagnetic signal reflected by the surface of the product, the reference reflector may advantageously comprise an upper portion providing a first impedance transition to a higher impedance for the transmitted electromagnetic signal; and a lower portion providing a second impedance transition to a lower impedance for the transmitted electromagnetic signal, the upper and lower portions being separated along the probe by a distance selected such that an electromagnetic signal reflected by the first impedance transition and an electromagnetic signal reflected by the second impedance transition together form a composite reflected electromagnetic signal having a positive portion and a negative portion, thereby facilitating discrimination of reference echo signal reflected by the reference reflector.

A reflection of a transmitted electromagnetic signal having a certain polarity, such as a "positive" pulse, at a transition to a lower impedance will have the same polarity as the transmitted electromagnetic signal, and a reflection at a transition to a higher impedance will have opposite polarity. Electromagnetic signals reflected by such opposite impedance transitions, that are suitably spaced apart, will consequently result in a composite electromagnetic signal having portions of opposite polarity. This will make such signals easily distinguishable from a signal reflected by the surface of the product, since the surface typically provides a single isolated impedance transition (typically to a lower impedance).

A suitable distance between the upper and lower portions is related to the pulse time, and for a 1 ns pulse, a distance of about 100 mm will yield an easily distinguishable composite electromagnetic signal. It should, however, be understood that there is a range of distances around this exemplifying distance that will serve the same purpose.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing a currently preferred embodiment of the invention, wherein:

FIG. 1b is a schematic illustration of the measurement electronics unit comprised in the radar level gauge system in FIG. 1a;

FIG. 2c schematically illustrates the echo profile of FIG. 2b modified using the initial disturbance echo profile of FIG. 2a;

FIG. 4b shows the echo profile of FIG. 4a modified using the initial disturbance echo profile of FIG. 2a;

FIG. 4c shows the echo profile of FIG. 4a modified using a disturbance echo profile including the portion of the acquired echo profile above the transition point in FIG. 4a;

FIG. 5b schematically illustrates an echo signal obtained from reflection at the reference reflector in FIG. 5a;

DETAILED DESCRIPTION OF A PREFERRED EMBODIMENT OF THE INVENTION

In the present detailed description, various embodiments of the radar level gauge system according to the present invention are mainly discussed with reference to a pulsed guided wave radar (GWR) level gauge system utilizing a single line probe. It should be noted that this by no means limits the scope of the present invention, which is equally applicable to GWR-systems being equipped with various other kinds of probes, such as two-lead probes, coaxial probes, etc.

Moreover, the present invention is also applicable to non-contact type radar level gauge systems, in which an electromagnetic signal is propagated towards the product contained in the tank using a radiating antenna, such as a cone antenna or a patch antenna.

Furthermore, reference is mainly made to filling level determination by means of measuring the time between transmitted and reflected pulses. As is, however, evident to the person skilled in the relevant art, the teachings of the present invention are equally applicable to radar level gauge systems utilizing phase information for determining the filling level through, for example, frequency-modulated continuous wave (FMCW) measurements.

When pulses modulated on a carrier are used, phase information can also be utilized.

Figure 1A:
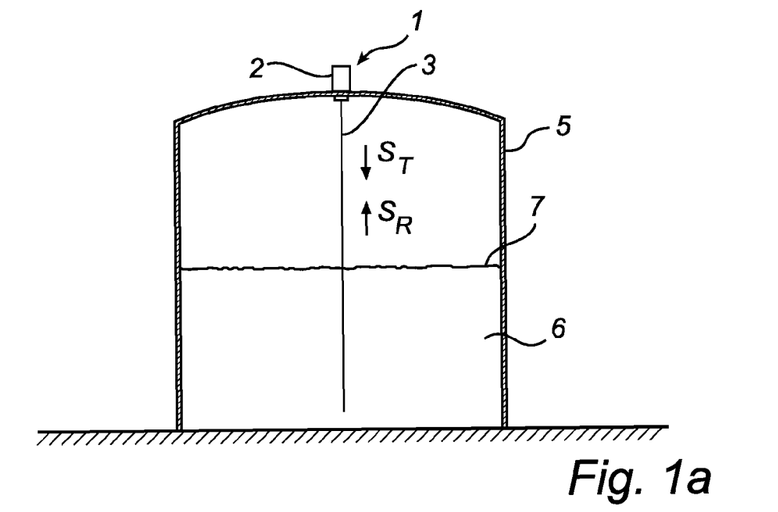
FIG. 1a schematically illustrates a radar level gauge system according to an embodiment of the present invention installed in an exemplary tank.

FIG. 1a schematically illustrates a radar level gauge system 1 according to an embodiment of the present invention, comprising a measurement electronics unit 2, and a probe 3. The radar level gauge system 1 is provided on a tank 5, which is partly filled with a product 6 to be gauged. By analyzing transmitted signals $S_T$ being guided by the probe 3 towards the surface 7 of the product 6, and echo signals $S_R$ traveling back from the surface 7, the measurement electronics unit 2 can determine the distance between a reference position and the surface 7 of the product 6, whereby the filling level can be deduced. It should be noted that, although a tank 5 containing a single product 6 is discussed herein, the distance to any material interface along the probe can be measured in a similar manner.

Figure 1B:
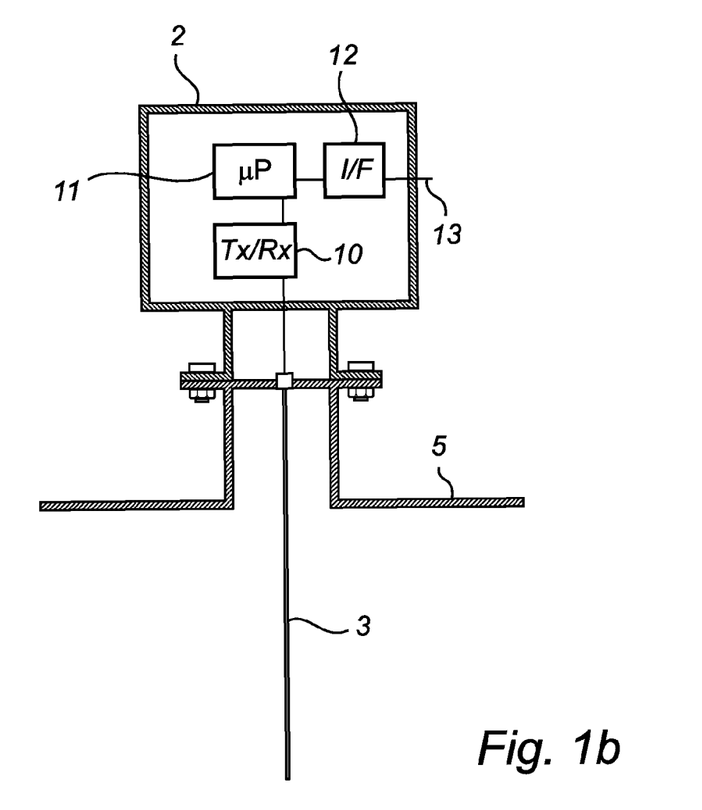

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is, furthermore, connectable to external communication lines 13 for analog and/or digital communication via an interface 12. Moreover, although not shown in FIG. 1b, the radar level gauge system 1 is typically connectable to an external power source, or may be powered through the external communication lines 13. Alternatively, the radar level gauge system 1 may be configured to communicate wirelessly.

Figure 2A:
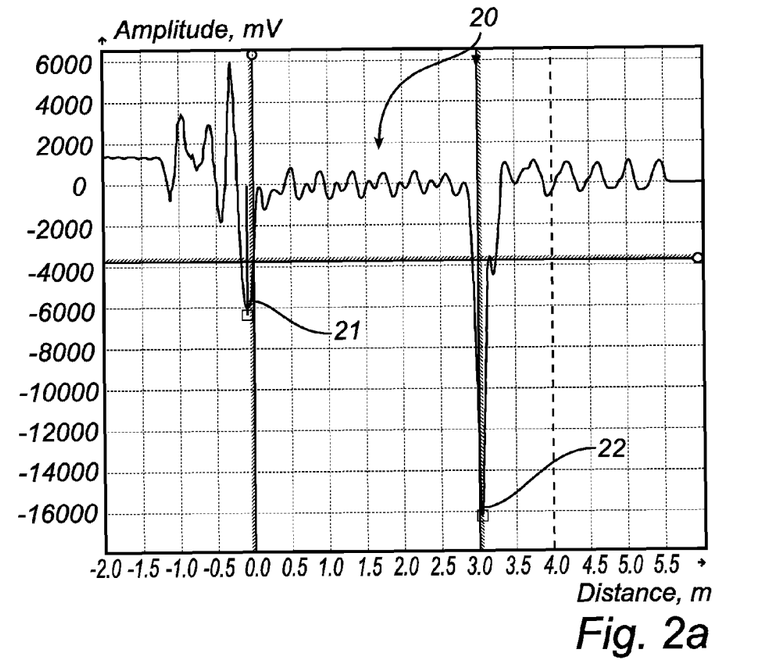
FIG. 2a schematically illustrates an initial disturbance echo profile obtained from a probe installed in an empty tank.
Figure 2B:
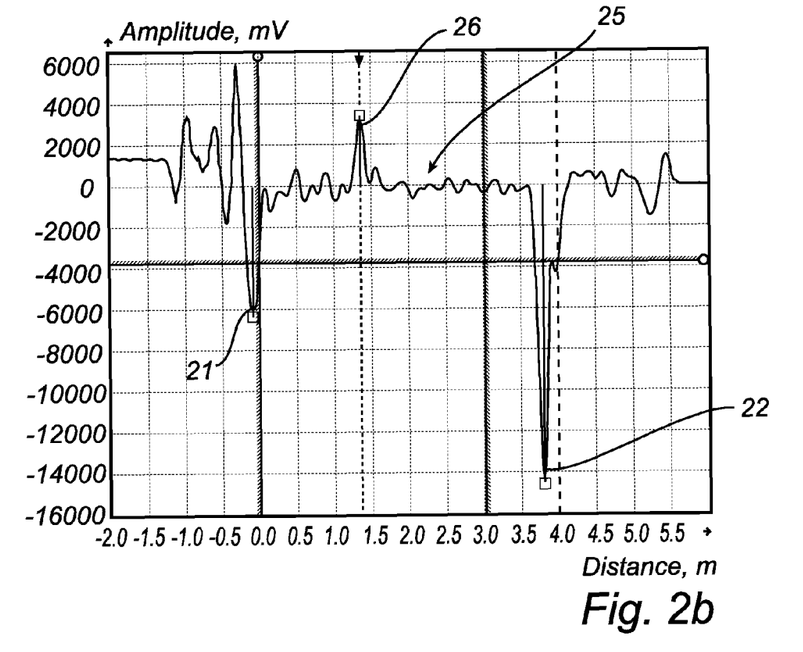
FIG. 2b schematically illustrates an exemplary acquired echo profile including a surface echo signal.
Figure 2C:
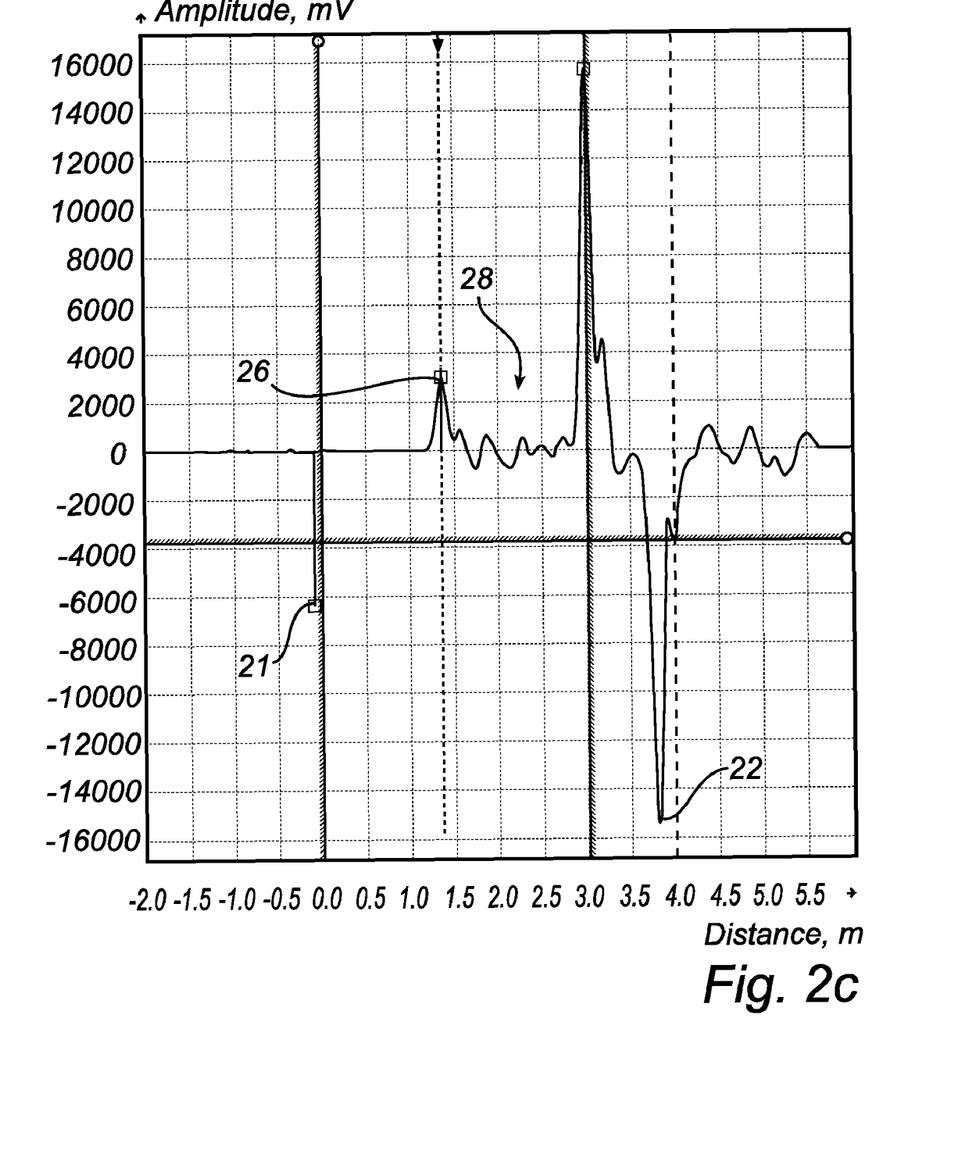

With reference to FIGS. 2a-c, different echo profiles resulting from signals returned to the transceiver 10 under different conditions will now be described.

The exemplary echo profile 20 shown in FIG. 2a results from a probe 3 that is installed in an empty tank 5. As can be seen in FIG. 2a, the echo profile 20 has first 21 and second 22 strong negative echoes. The first negative echo 21 results from reflection of the transmitted signal $S_T$ in FIG. 1a at the interface between the measurement electronics unit 2 and the probe 3, and the second negative echo 22 results from reflection at the end of the probe 3.

In FIG. 2b, another exemplary echo profile 25 is shown, comprising a further echo 26 resulting from reflection of the transmitted signals $S_T$ at the surface 7 of the product 6 in the tank 5. As is evident from FIG. 2b, the acquired echo profile includes a number of disturbance echo signals that, in the present exemplary case, have significantly lower amplitude than the surface echo signal. In cases when the surface echo signal is especially weak, for example when the product to be gauged has a relative permittivity that is close to the relative permittivity of the atmosphere in the tank, or when especially strong disturbance echo signals are present, there is, however, a risk that a disturbance echo signal is classified as the surface echo signal and an incorrect filling level determination is obtained.

In order to prevent such an incorrect filling level determination, it is useful to modify the acquired echo profile of FIG. 2b using the initial disturbance echo profile of FIG. 2a. The result of such a modification, in this case a subtraction of the echo profile of FIG. 2a from the echo profile of FIG. 2b, is shown in FIG. 2c.

Referring to FIG. 2c, an echo profile 28 can be seen in which the surface echo signal 26 is the first echo signal in the echo profile 28 after the reference echo signal 21. Clearly, the use of a modified echo profile 28 can facilitate filling level determination.

The modified echo profile 28 of FIG. 2c is likely to be very useful as long as the disturbance situation along the probe is approximately the same as when the initial disturbance echo profile was acquired. As conditions change inside the tank 5, new disturbance echo signals may be added due to, for example, probe contamination. Such probe contamination may, for instance, result from accumulation of product residue on the probe 3 as will be described further below.

Another reason for wanting to update the initial disturbance echo profile is that the echo profile determined by the radar level gauge system may change over time due to changes, such as temperature drifts, in the measurement electronics. This may, in particular, disturb the filling level determination in the so-called "near zone" (when the tank is almost full), because of perceived varying location and/or shape of the reference echo signal 21 close to the transceiver. When the reference echo signal 21, which is a relatively strong echo signal, varies, it will no longer be possible to completely cancel this reference echo signal 21 using the initial disturbance profile.

Figure 3:
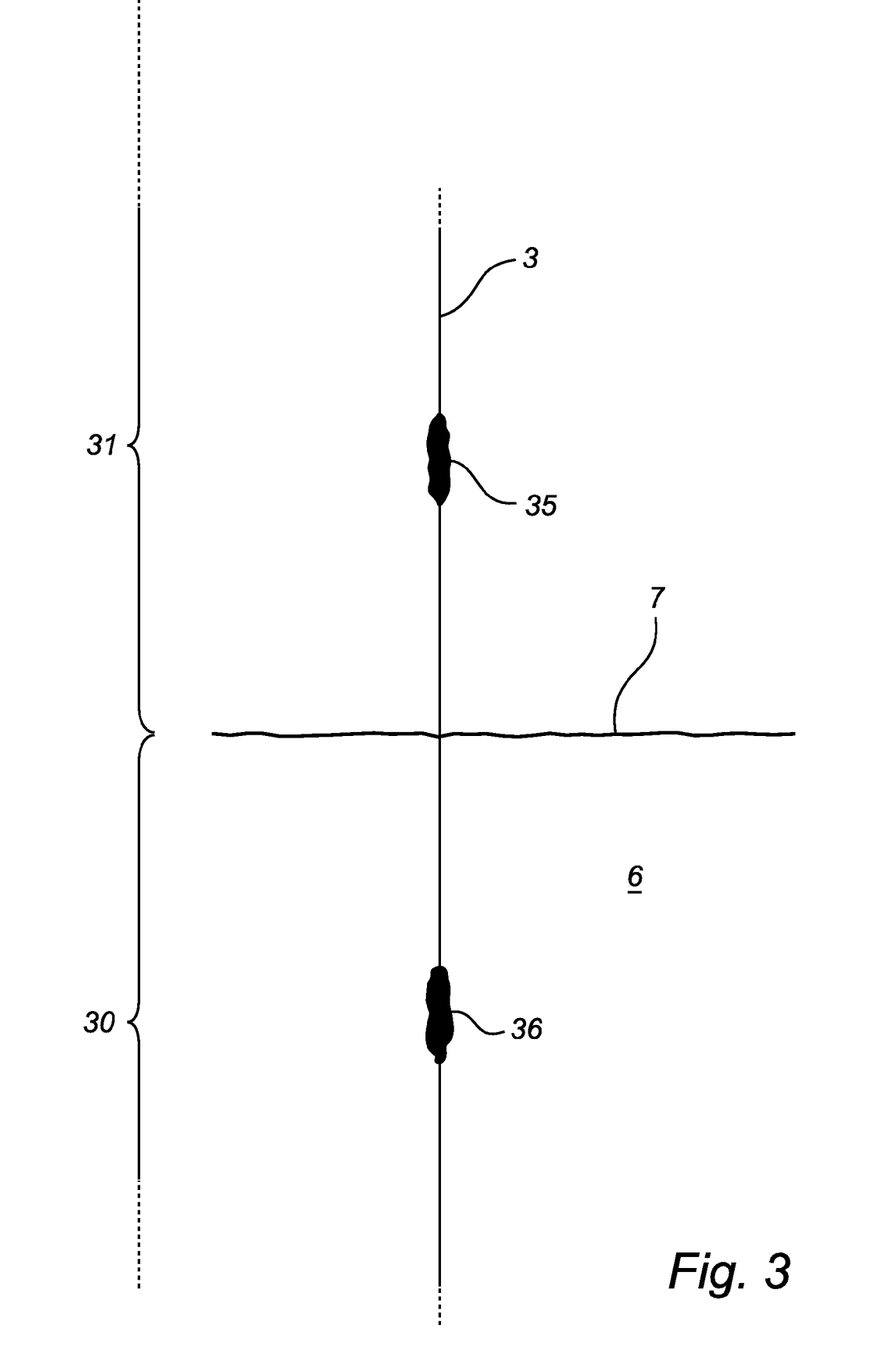
FIG. 3 schematically illustrates a portion of the probe of the system in FIG. 1a with product residue adhered thereto.

In FIG. 3, a segment of the probe 3 comprising a submerged portion 30 and an unsubmerged portion 31 is shown. As can be seen in FIG. 3, there are two "lumps" 35 and 36 (a lump may be a concentrated accumulation of the product 6) adhered to the probe 3 above and below the surface 7 of the product 6, respectively.

Depending on the properties of such lumps 35, 36, they may return echo signals that are similar to the surface echo signal returned by the surface 7 of the product 6.

Figure 4A:
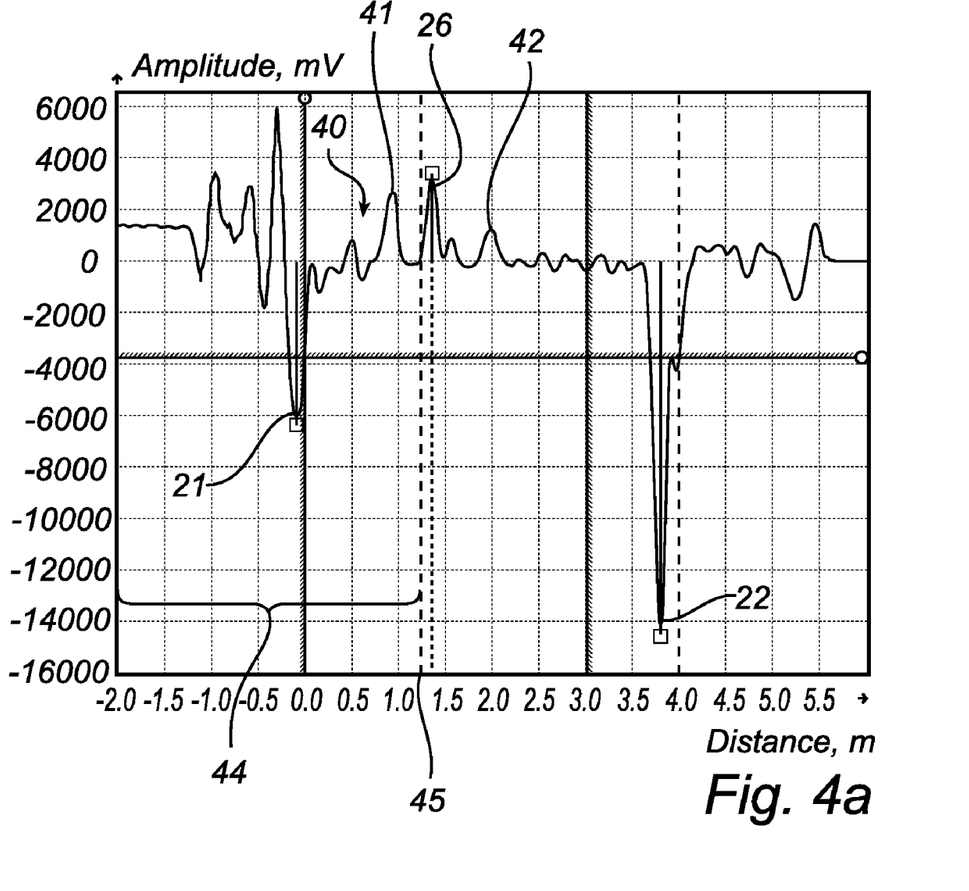
FIG. 4a shows an exemplary echo profile acquired using the contaminated probe in FIG. 3.

FIG. 4a shows an exemplary echo profile 40 that may be obtained using the contaminated probe 3 shown in FIG. 3. Comparing the echo profile 40 with the corresponding echo profile 25 of FIG. 2b which was obtained using an uncontaminated probe, it is evident that further echo signals 41, 42 have been added to the echo profile 25 in addition to the reference echo signals 21, 22 and the surface echo signal 26. Of these further echo signals, the echo signal 41 above the surface 7 of the product results from reflection of the transmitted electromagnetic signal at the "lump" 35 above the surface 7 and the echo signal 42 below the surface 7 results from reflection at the "lump" 36 below the surface 7.

In the exemplary case illustrated in FIG. 4a, it is clear that at least the echo signal 41 above the surface 7 is of the same order of magnitude as the surface echo signal 26 and there is a risk that this echo signal 41 is erroneously classified as the surface echo signal, which would result in an incorrect filling level determination.

Figure 4B:
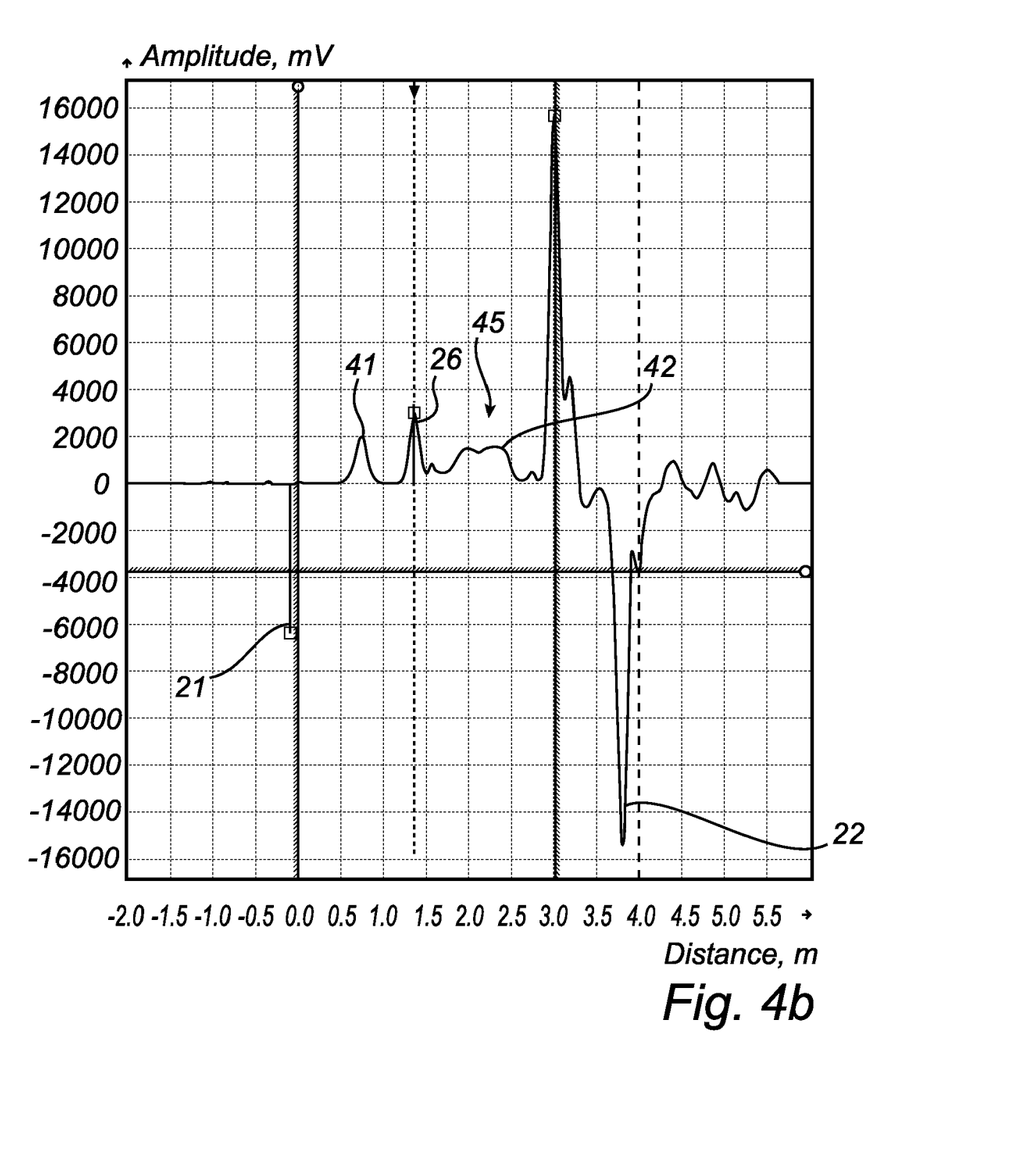

FIG. 4b shows a modified echo profile 45 formed by subtracting the initial disturbance echo profile 20 of FIG. 2a from the acquired echo profile 40 of FIG. 4a. Because the "lumps" 35, 36 were not present on the probe 3 when the initial contamination echo profile 20 was determined, the disturbance echo signals resulting from reflection at the "lumps" 35, 36 are not removed from the acquired echo profile and there is again a risk of incorrect filling level determination.

To improve this situation, the initial disturbance echo profile 20 may be updated during operation of the radar level gauge system.

Figure 4C:
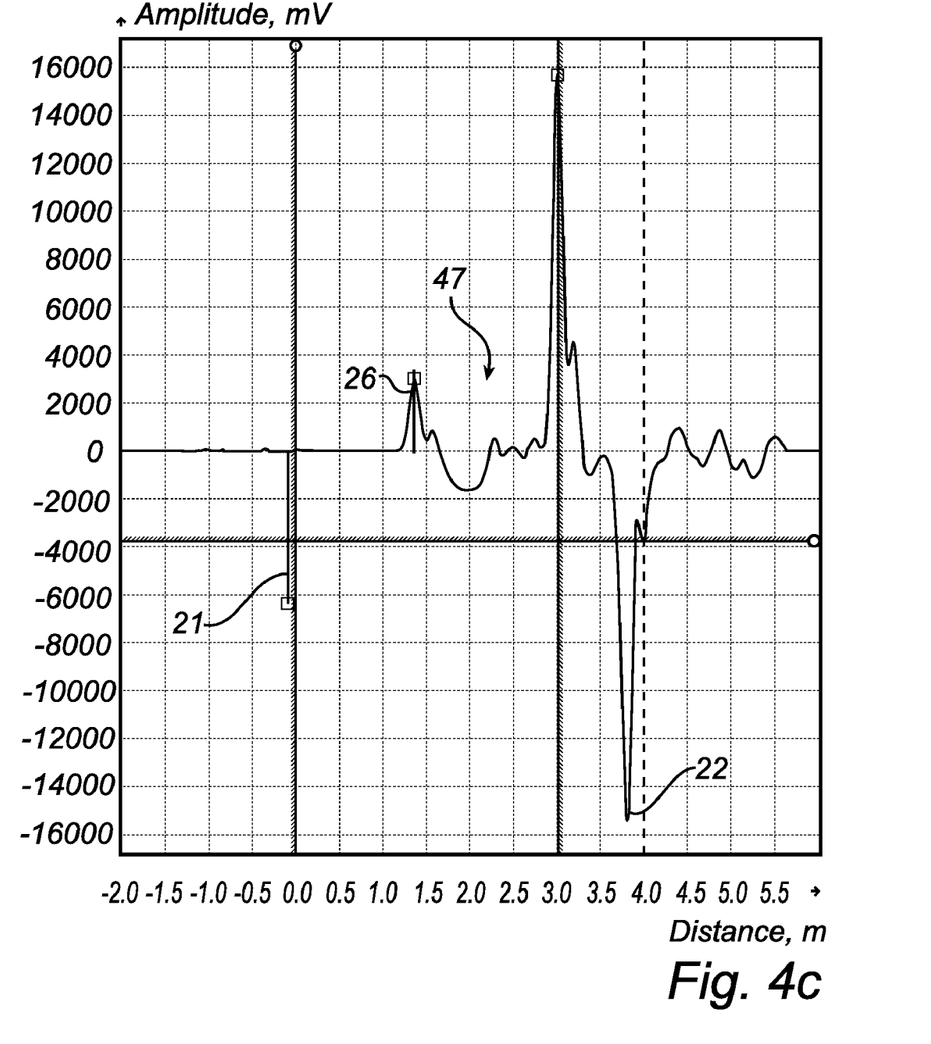

FIG. 4c shows an echo profile 47 which has been modified by an updated disturbance echo profile formed using a portion 44 of the echo profile 40 in FIG. 4a to the left of the transition point 45 indicated in FIG. 4a corresponding to a portion of the probe 3 located above the update level, and thus above the surface 7 of the product 6 in the tank 5, to replace the corresponding portion of the initial disturbance echo profile 20 of FIG. 2a.

Clearly, the modified echo profile 47 facilitates a correct determination of the filling level.

An important aspect in updating the initial disturbance echo profile 20 is the determination of the update level, which is equivalent to the transition point 45 in FIG. 4a. If the update level is too far above the surface 7, relevant disturbance echo signals may not be removed from the acquired echo profile, and if the update level is below the surface, the surface echo signal will be compensated for, which, obviously, may lead to strange and unwanted results.

Accordingly, a reliable determination of the update level (transition point 45) is an important issue, which is addressed through an embodiment of the present invention by making use of knowledge about the position of a reference impedance transition (equivalent to the distance from a reference position close to the transceiver to the reference impedance transition) and the permittivity of the product in the tank. Hereby, the distance from the reference position to the surface can be determined using the following relation:

$$D_{surf} = \frac{\sqrt{\varepsilon_r} D_{ref,known} - D_{ref,elec}}{\sqrt{\varepsilon_r} - 1}, \text{ where}$$

$D_{surf}$ is the distance to the surface, $D_{ref,known}$ is the known, physical distance to the reference impedance transition below the surface of the product, $D_{ref,elec}$ is the "electrical" distance to the reference impedance transition determined using the reference echo signal, and $\varepsilon_r$ is the relative permittivity of the product in the tank.

It has here been assumed that the relative permittivity of the atmosphere in the tank 5 is 1. In cases when this cannot be assumed, it will still be straight-forward for the skilled person to calculate the surface level if the relative permittivities of the product and the atmosphere above the surface of the product are known.

It is understood that each of the distances referred to above is determined from a reference position in the vicinity of the transceiver, such as an impedance transition at the connection between transceiver and probe, or the tank ceiling, the process seal, the connection flange, etc.

As reference impedance transition for determining the update level and thus determining the disturbance echo profile, any suitable impedance transition at a known position may be used, such as, for example the submerged end of the probe 3. Alternatively, a dedicated reference reflector may be used. In the following, exemplary reference reflector configurations will be described with reference to FIGS. 5a-b and FIGS. 6a-c.

Figure 5A:
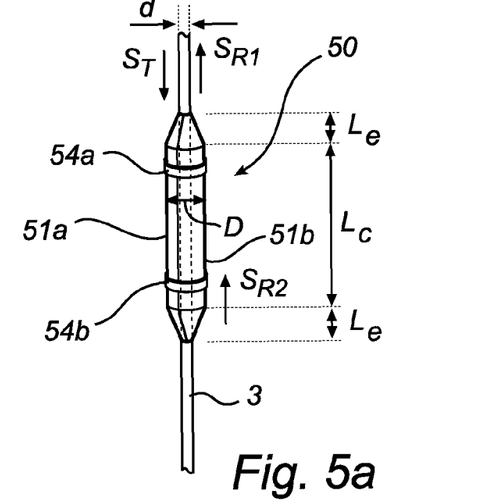
FIG. 5a schematically illustrates an exemplary reference reflector suitable for use in the radar level gauge system of the present invention.
Figure 5B:
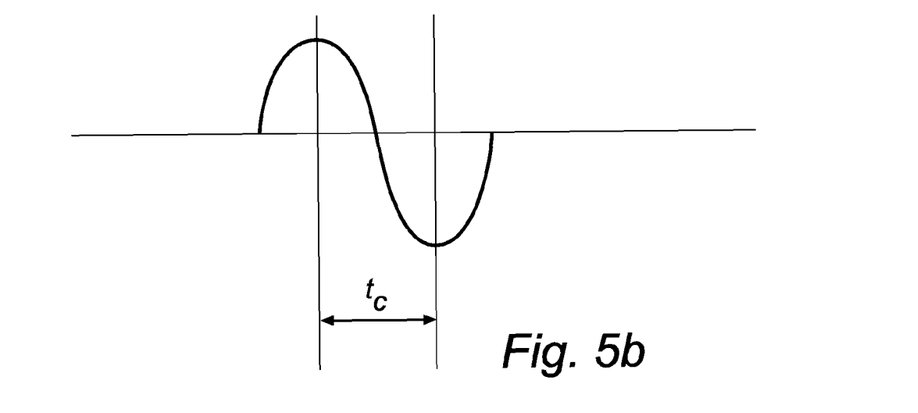

FIGS. 5a-b schematically show a first exemplary reference reflector and a distinguishable echo signal obtained from this reference reflector.

In FIG. 5a, a reference reflector 50 is shown provided on a portion of the probe 3. According to the presently illustrated example, the reference reflector 50 is provided in the form of two halves 51a and 51b, which are clamped to the probe 3 by means of two clamps 54a-b. The reference reflector 50 has an essentially cylindrical portion with a length $L_c$, and first and second essentially frustoconically shaped ends that smoothly slope towards the probe 3 and each extends a length $L_e$.

Through the provision of the reference reflector 50 in FIG. 5a, the probe 3 becomes locally thicker and thus locally exhibits a lower impedance. Electromagnetic signals $S_T$ traveling down along the probe 3 will therefore be partly reflected first at the top of the reference reflector 50 and then at the bottom of the reference reflector. The reflection at the top of the reference reflector is the result of reflection at a transition to a lower impedance, and the resulting reflected signal $S_{R1}$ will therefore have the same sign as the incoming signal $S_T$. Analogously, the reflection at the bottom of the reference reflector will result in a reflected signal $S_{R2}$ will having opposite sign/polarity to the incoming signal $S_T$.

The purpose of the sloping ends of the reference reflector 50 in FIG. 5a is to avoid ledges on which product 6 in the tank 5 can accumulate and disturb the measurement. Furthermore, the length $L_e$ of each sloping end of the reference reflector 50 should be considerably shorter than a pulse length for a pulsed system. For example, in the case of a 1 ns pulse, the pulse length is about 150 mm, and the length $L_e$ of each sloping end should be less than about 20 mm. It should be noted that the sloping ends may have mutually different lengths and/or shapes.

The diameter of the reference reflector 50 in FIG. 5a is selected such that about 1% of the power of an incoming signal $S_T$ is reflected at each end of the reference reflector.

Moreover, the length $L_c$ of the central portion of the reference reflector 50 is advantageously selected such that the top and bottom reflected signals $S_{R1}$ and $S_{R2}$ combine to form an easily distinguishable wave form.

Exemplary dimensions for the reference reflector 50 in FIG. 5a in order to achieve a suitable reference reflector signal and at the same time reduce the risk of excessive probe contamination, are provided below and ideally result in the waveform schematically shown in FIG. 5b.

Pulsed system—pulse length $t_p$: 1 ns
Probe diameter d: 6 mm
Reference reflector diameter D: 20 mm
Length of cylindrical portion $L_c$: 100-150 mm
Length of sloping portions: $L_e$<20 mm These parameters would typically result in a reflection coefficient of about 0.08 (a 1 mm layer of PTFE would give a reflection coefficient of about 0.14) due to the change of impedance along the probe. Hereby, excessive attenuation of the electromagnetic signals transmitted along the probe 3 is avoided, while at the same time achieving distinguishable signals resulting from reflections at the reference reflectors.

As discussed above, there will be two reflections $S_{R1}$ and $S_{R2}$ which are separated in time and of opposite polarity. By matching the time $t_c$ between the reflected signals $S_{R1}$ and $S_{R2}$ with the pulse length $t_p$, an incoming half period will be reflected as an easily distinguishable full period.

In the exemplary case represented by the parameters given above, the length $L_c$ of the cylindrical portion 52 may, for example, be selected to about 100 mm to yield a full-period curve form, is indicated in FIG. 5b, for the composite reflected signal $S_{R1}+S_{R2}$ for a submerged reference reflector 50 ($t_p$=1 ns corresponds to about 100 mm in a liquid that is transparent for microwave radiation. Alternatively, the length $L_c$ can be selected to about 150 mm to yield a full-period curve form for an unsubmerged reference reflector 30. Obviously, other lengths $L_c$ can be selected for achieving an easily distinguishable composite reflected signal.

In the above, the design of a reference reflector 50 for a pulsed guided wave radar GWR system has been exemplified, in which the length $L_c$ of the reference reflector 50 is related to the pulse length $t_p$ in such a way that an easily distinguishable reflected signal is achieved.

Above, one exemplary embodiment of a suitable reference reflector has been described with reference to FIG. 5a. Being made of metal and having no steps or edges, this reference reflector embodiment is durable and would not be prone to accumulate excessive amounts of product contamination. However, other designs and material selections are possible and may be preferable depending on the particular application. Below, a number of alternative embodiments will be described and discussed with reference to FIGS. 6a-c.

Figures 6A, 6B:
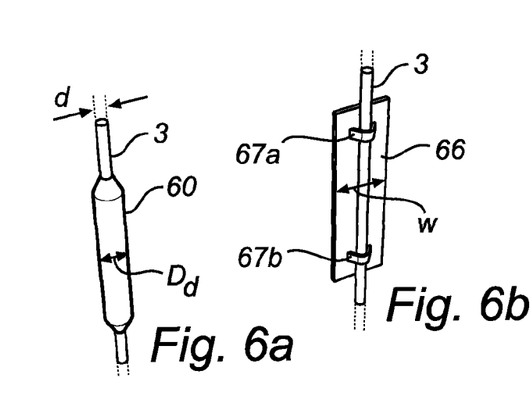
FIGS. 6a-c schematically illustrate various exemplary reference reflectors for use in various embodiments of the radar level gauge system according to embodiments of the present invention.

According to a first alternative embodiment schematically illustrated in FIG. 6a, the reference reflector 60 may be provided in the form of a dielectric body having essentially the same shape as the reference reflector in FIG. 5a. This dielectric reference reflector 60 may for example be made of PTFE or another suitable dielectric material or combination of materials. Calculations give that the diameter $D_d$ of the central portion of the reference reflector 60 in FIG. 6a can be smaller than is the case for the metal sleeve reference reflector 50 in FIG. 5a. To achieve a corresponding function, the diameter $D_d$ of the dielectric reference reflector 60 may be about 9 to 12 mm for a probe diameter d of 6 mm. Furthermore, the dielectric body may be provided as an integral part adhering to the probe 3 to avoid spaces that might otherwise be infiltrated by the product 6 in the tank 5. For example, the dielectric body can be molded around the probe 3, or the dielectric body can be provided as separated parts, which are then melted and allowed to harden at the desired location along the probe 3.

According to a second alternative embodiment schematically illustrated in FIG. 6b, the reference reflector 65 may be provided in the form of a metallic plate 66 that is attached to the probe by holders 67a-b. Such a metallic plate 66 locally makes the probe 3 thicker in an electrical sense. That is, the impedance of the probe 3 is lower at the location of the plate 66. For example, a steel plate having a width W=2$D_c$ electrically corresponds to the sleeve type reference reflector 50 in FIG. 5a, having a diameter $D_c$. The reference reflector 65 in FIG. 6b is simpler to manufacture and attach but is more sensitive to contamination by the product in the tank.

Figure 6C:
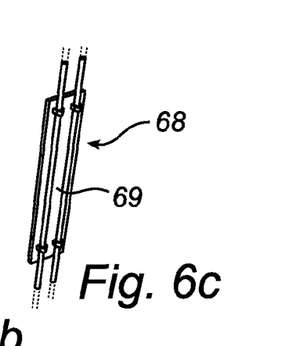

In FIG. 6c, a third alternative embodiment of a reference reflector 68 is schematically illustrated, according to which a metal plate 69 is attached to a two-wire probe 3.

Figure 7:
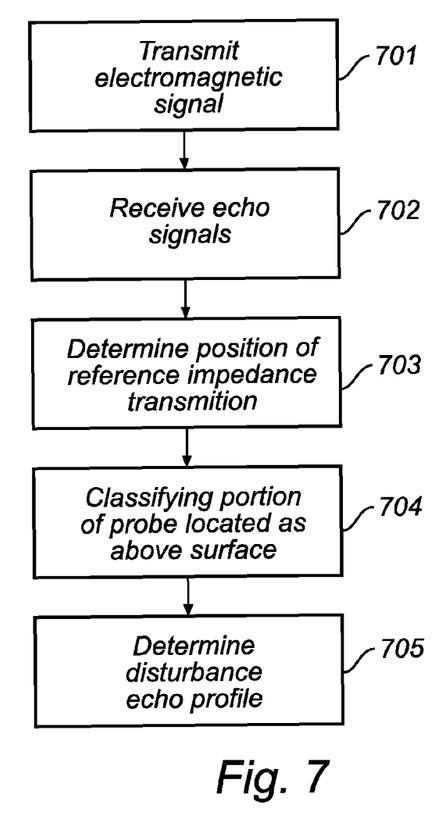
FIG. 7 is a flow-chart schematically illustrating determination of a disturbance echo profile.

With reference to the schematic flow-chart in FIG. 7, an embodiment of a method according to the present invention, for determining a disturbance echo profile will now be described.

In a first step 701, an electromagnetic signal $S_T$ is transmitted by the transceiver 10 and guided by the probe 3 towards the product 6 contained in the tank 5. The transmitted electromagnetic signal $S_T$ is reflected at impedance discontinuities that it encounters along the probe 3, one of these impedance discontinuities being the surface 7 of the product 6. The reflections of the transmitted electromagnetic signal $S_T$ are subsequently received by the transceiver 10 as echo signals $S_R$ in step 702.

Based on the time between the transmission of the transmitted electromagnetic signal $S_T$ and the reception of the echo signals $S_R$, the respective distances from a reference position in the vicinity of the transceiver 10 to the various impedance transitions can be determined. The distances are determined based on the time-of-flight of the reflected signals and the propagation velocity of the signals. The propagation velocity depends on the material properties of the medium through which the signals propagate, and is determined according to the following relation:

$$v_{prop} = \frac{v_0}{\sqrt{\varepsilon_r}},$$

where $v_0$ is the propagation velocity of electromagnetic signals along the probe in vacuum; and $\in_r$ is the relative permittivity of the product.

Since the propagation velocity along to probe 3 of the electromagnetic signals depends on the medium through which the signals propagate, the distance to an impedance transition determined using the received echo signals will depend on whether or not the impedance transition is located above or below the surface 7 of the product 6—if the impedance transition is located below the surface 7 it will appear to be further away from the transceiver than it actually is. This effect can be used to get a reliable indication of the position along the probe of the surface 7 of the product, which in turn can be used to provide a very reliable transition point for the determination of the disturbance echo profile.

Accordingly, in step 703, the "electrical" position of a reference impedance transition, such as the submerged end of the probe 3 or a submerged reference reflector, is determined using the reference echo signal resulting from reflection of the transmitted electromagnetic signal at the reference impedance transition.

Subsequently, in step 704, a portion of the probe 3 is classified as being located above the surface 7 based on the signal propagation characteristics of the product 6 in the tank 5, the known position of the reference impedance transition and the "electrical" position of the reference impedance transition determined in step 703.

Finally, in step 705, the disturbance echo profile is determined based on echo signals reflected by impedance transitions located along the portion of the probe classified in step 704 as being located above the surface 7 of the product 6. The steps 703 to 705 above are performed by the microprocessor 11 comprised in the measurement electronics unit 2 of the radar level gauge system in FIG. 1.

Figure 8:
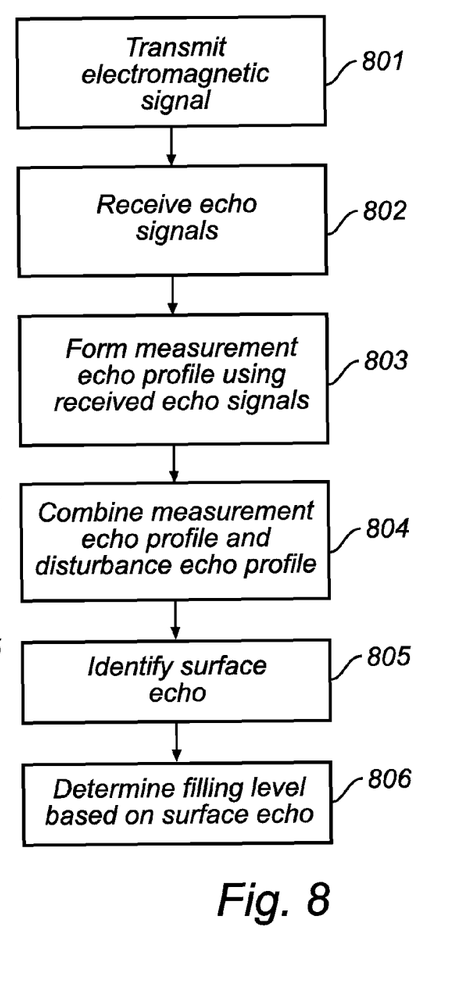
FIG. 8 is a flow-chart schematically illustrating a method of determining a filling level of a product contained in a tank.

As will now be described with reference to FIG. 8, this disturbance echo profile may advantageously be used in a method of determining a filling level of a product 6 contained in a tank 5.

In the first step 801, an electromagnetic signal is transmitted along the probe 3 by the transceiver 10. As explained above in connection with steps 701 and 702, the transmitted electromagnetic signal $S_T$ is partly reflected at impedance transitions along the probe 3 so that echo signals are returned along the probe 3 to the transceiver where they are received in step 802.

In the next step 803, a measurement echo profile is formed using the received echo signals, and then this measurement echo profile is combined with the disturbance echo profile to form a combined echo profile in step 804. Thereafter, the surface echo is identified by analyzing the combined echo profile, for example by using a predetermined amplitude threshold value, in step 805, and finally, in step 806, the filling level of the product 6 contained in the tank 5 is determined based on the surface echo. The steps 803 to 806 above are performed by the microprocessor 11 comprised in the measurement electronics unit 2 of the radar level gauge system in FIG. 1.

The person skilled in the art realizes that the present invention by no means is limited to the preferred embodiments described above. For example, the radar level gauge system may be of the non-contact type, and the reference impedance transition may then, for example, be constituted by the bottom of the tank. Moreover, the reference impedance transition may be located above the surface of the product contained in the tank.

What is claimed is:

1. A method of determining a filling level of a product contained in a tank, said method comprising:

generating and transmitting electromagnetic signals;

propagating said transmitted electromagnetic signals towards a surface of said product contained in the tank along a probe extending towards and into said product contained in the tank;

receiving echo signals resulting from reflections at impedance transitions encountered by said transmitted electromagnetic signals, including a surface echo signal resulting from reflection at said surface of said product;

determining a position of a reference impedance transition using a reference echo signal resulting from reflection of said transmitted electromagnetic signals at said reference impedance transition;

determining if said reference impedance transition is located above the surface of said product based on said determined position and a known position of the reference impedance transition;

if said reference impedance transition is determined to be located above the surface of said product, determining an update level located above said surface, based on said position of the reference impedance transition;

determining a disturbance echo profile using at least one of said echo signals resulting from reflection of said transmitted signals at least one impedance transition located above said update level; and determining said filling level based on said received echo signals and said disturbance echo profile.

2. The method according to claim 1, wherein said reference impedance transition is a reference reflector provided at a known position along said probe.

3. The method according to claim 1, further comprising updating a previously stored disturbance echo profile using said determined disturbance echo profile.

4. The method according to claim 1, wherein determining said filling level comprises:

forming a measurement echo profile using the received echo signals;

combining said measurement echo profile and said disturbance echo profile to form a combined echo profile;

identifying said surface echo signal using said combined echo profile; and determining said filling level based on said identified surface echo signal.

5. A radar level gauge system, for determining a filling level of a product contained in a tank, comprising:

a transceiver for generating, transmitting and receiving electromagnetic signals;

a probe electrically connected to said transceiver and arranged to extend towards and into said product contained in the tank for guiding transmitted electromagnetic signals towards a surface of the product, and guiding echo signals resulting from reflections at impedance transitions encountered by the transmitted electromagnetic signals, including a surface echo signal resulting from reflection at said surface, back to said transceiver;

a reference impedance transition provided along the probe at a known position in the tank; and processing circuitry for:
determining a position of said reference impedance transition using a reference echo signal resulting from reflection of said transmitted electromagnetic signals at said reference impedance transition;
determining if said reference impedance transition is located above the surface of said product based on said determined position and a known position of the reference impedance transition;
if said reference impedance transition is determined to be located above the surface of said product, determining an update level located above said surface, based on said position of the reference impedance transition;
determining a disturbance echo profile using at least one of said echo signals resulting from reflection of said transmitted signals at least one impedance transition located above said update level; and
determining said filling level based on said received echo signals and said disturbance echo profile.

6. The radar level gauge system according to claim 5, wherein said processing circuitry is further configured to:
form a measurement echo profile using the received echo signals;
combine said measurement echo profile and said disturbance echo profile to form a combined echo profile;
identify said surface echo signal using said combined echo profile; and
determine said filling level based on said identified surface echo signal.

7. The radar level gauge system according to claim 5, wherein said reference impedance transition is a reference reflector provided at a known position along said probe.

8. The radar level gauge system according to claim 7, wherein said reference reflector has an upper portion providing a first impedance transition to a higher impedance for said transmitted electromagnetic signal; and a lower portion providing a second impedance transition to a lower impedance for said transmitted electromagnetic signal.

9. The radar level gauge system according to claim 8, wherein said upper and lower portions of the reference reflector are separated along the probe by a distance selected such that an electromagnetic signal reflected by said first impedance transition and an electromagnetic signal reflected by said second impedance transition together form a composite reflected electromagnetic signal having a positive portion and a negative portion.

10. A method of determining a disturbance echo profile for a radar level gauge system, said method comprising:
generating and transmitting electromagnetic signals;
propagating said transmitted electromagnetic signals towards a surface of said product contained in the tank along a probe extending towards and into said product contained in the tank;
receiving echo signals resulting from reflections at impedance transitions encountered by said transmitted electromagnetic signals, including a surface echo signal resulting from reflection at said surface of said product;
determining a position of a reference impedance transition using a reference echo signal resulting from reflection of said transmitted electromagnetic signals at said reference impedance transition;
determining if said reference impedance transition is located above the surface of said product based on said determined position and a known position of the reference impedance transition;
if said reference impedance transition is determined to be located above the surface of said product, determining an update level located above said surface, based on said position of the reference impedance transition; and
determining said disturbance echo profile using at least one of said echo signals resulting from reflection of said transmitted signals at least one impedance transition located above said update level.

11. The method according to claim 10, further comprising updating a previously stored disturbance echo profile using said determined disturbance echo profile.

12. A radar level gauge system, for determining a filling level of a product contained in a tank, comprising:
a transceiver for generating, transmitting and receiving electromagnetic signals;
a probe electrically connected to said transceiver and arranged to extend towards and into said product contained in the tank for guiding transmitted electromagnetic signals towards a surface of the product, and guiding echo signals resulting from reflections at impedance transitions encountered by the transmitted electromagnetic signals, including a surface echo signal resulting from reflection at said surface, back to said transceiver;
a reference impedance transition provided along the probe at a known position in the tank; and
processing circuitry for determining said filling level based on said received echo signals and a disturbance echo profile determined using the method according to claim 10.

* * * * *